United States Patent [19]
Pan

[11] Patent Number: 6,008,501
[45] Date of Patent: Dec. 28, 1999

[54] APPARATUS AND METHOD FOR AUTOMATICALLY DETECTING PRESENCE OF A SCANNED DOCUMENT

[75] Inventor: Gordon Pan, Hsinchu, Taiwan

[73] Assignee: Mustek Systems Inc., Hsinchu, Taiwan

[21] Appl. No.: 08/901,608

[22] Filed: Jul. 28, 1997

[51] Int. Cl.[6] .................................................. G01N 21/86
[52] U.S. Cl. ....................................... 250/559.4; 358/488
[58] Field of Search ........................... 250/559.4, 559.44, 250/234; 358/488, 486, 464, 455, 497

[56] References Cited

U.S. PATENT DOCUMENTS

| | | | |
|---|---|---|---|
| 5,568,281 | 10/1996 | Kochis et al. | 358/475 |
| 5,760,412 | 6/1998 | Yang et al. | 250/559.4 |
| 5,786,590 | 7/1998 | Lin | 250/208.1 |

*Primary Examiner*—Que T. Le
*Attorney, Agent, or Firm*—Harness, Dickey & Pierce, P.L.C.

[57] ABSTRACT

The present invention discloses a scanned document auto-detecting apparatus for detecting the presence of a scanned document without additional control circuit. Based on the decision result, a scanning procedure starts to degrade cost by removing the additional control circuit, and furthermore, the scanned document auto-detecting apparatus can prevent users from running the scanning procedure wastefully when there is no scanned document. The scanned document auto-detecting apparatus sets a specific pattern at inner side of the cover. This specific pattern is first scanned before the scanning procedure starts as to decide the presence of the scanned document.

9 Claims, 6 Drawing Sheets

APPARATUS AND METHOD FOR AUTOMATICALLY DETECTING PRESENCE OF A SCANNED DOCUMENT

BACKGROUND OF THE INVENTION

1. Field of the Invention

The present invention relates a scanned document auto-detecting apparatus of detecting the presence of a scanned document without additional control circuit. Based on the decision result, a scanning procedure starts to degrade cost by removing the additional control circuit. The scanned document auto-detecting apparatus prevents users from running the scanning procedure wastefully when there is no scanned document.

2. Description of the Prior Art

As science goes on getting progress, many kinds of products are produced and modified each day, and a similar progress also occurs in optical systems such as scanners. There is a trend of mounting a scanner with higher resolution inside the case of a computer as a standard equipment.

Rollers are conventionally used to feed the scanned document into the scanner, wherein the rollers damage the surfaces of the scanned document when the scanned document is being fed. However, the roller-feeding scanner can not scan transparent documents such as lantern slides, and the rollers are easily dirtied by dust that will generate black or unusual color lines in images. In addition, the sizes of the mechanical and optical elements are not effectively degraded for achieving the purpose of mounting inside the case.

Another common scanning scheme is to put the scanned document inside a tray (or a cassette), and then feeds the scanned document for scanning. The tray (or the cassette) prevents the surface of the scanned document from being damaged by directly contacting. Paper jam that usually appears in the roller-feeding scanner is also overcome. In addition, the scheme does not need to clean dust frequently as the roller-feeding scanner does, and the convenience of operation is apparently upgrading.

There is an important function that a decision procedure is first applied to decide the presence of a scanned document. If the decision result indicates that the scanned document is absent then the scanning procedure will be terminated. Because a user may fail to put the scanned document inside the tray and start the scanning procedure, it is thus necessary for a scanner to avoid this situation.

An additional control circuit is conventionally applied as to perform a decision procedure, such as detecting the weight of the scanned document or checking existence indicating parameters for deciding the presence of the scanned document. Because the additional control circuit is completely irrelevant with the scanning procedure, which will require additional cost and spaces and thus increase the layout difficulty. Therefore, a detecting apparatus is needed as to automatically detect the presence of the scanned document.

SUMMARY OF THE INVENTION

The principal object of the present invention is to provide a scanner capable of detecting presence of a scanned document exists without additional control circuit.

The scanned document auto-detecting apparatus allocates a specific pattern at inner side of the tray cover. The position where the specific pattern allocated will be first scanned before the scanning procedure starts, and the scanning procedure will be terminated if the specific pattern is scanned.

BRIEF DESCRIPTION OF THE DRAWINGS

The foregoing aspects and many of the attendant advantages of this invention will become more readily appreciated as the same becomes better understood by reference to the following detailed description, when taken in conjunction with the accompanying drawings, wherein.

DESCRIPTION OF THE PREFERRED EMBODIMENT

Figure 1A:
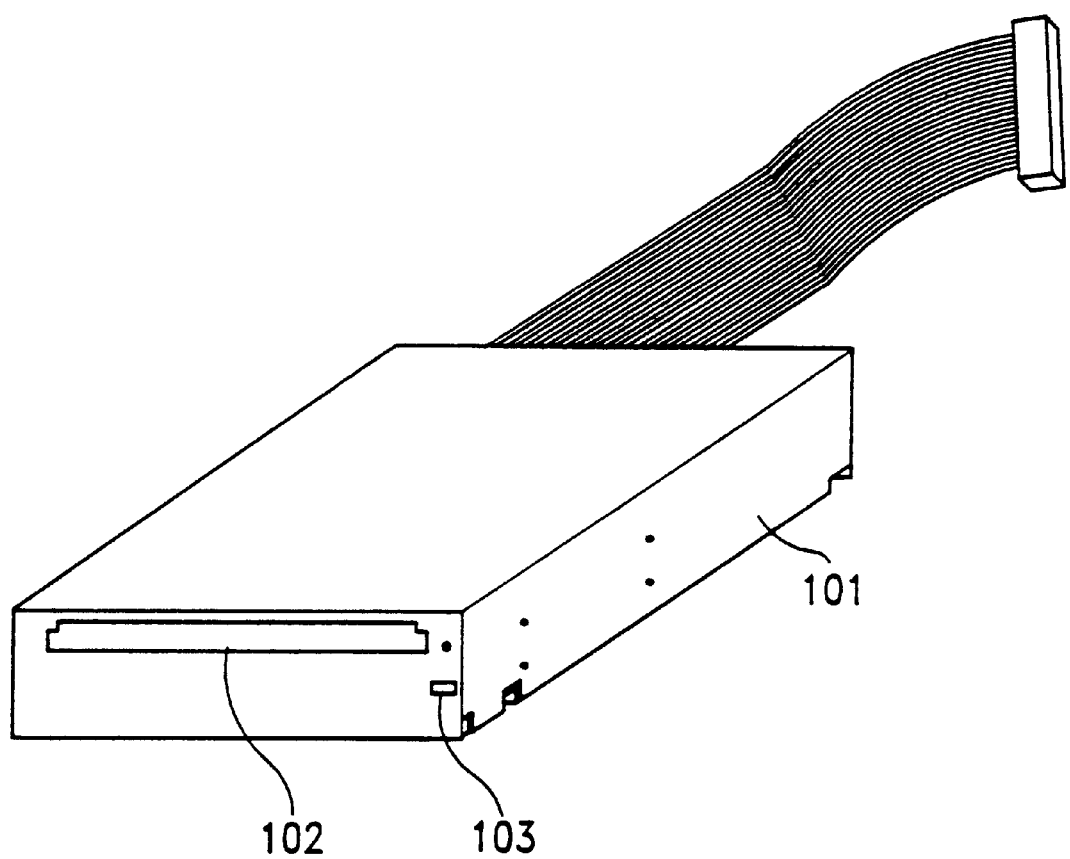
FIG. 1A represents a perspective view of the scanned document auto-detecting apparatus according to the invention.
Figure 1B:
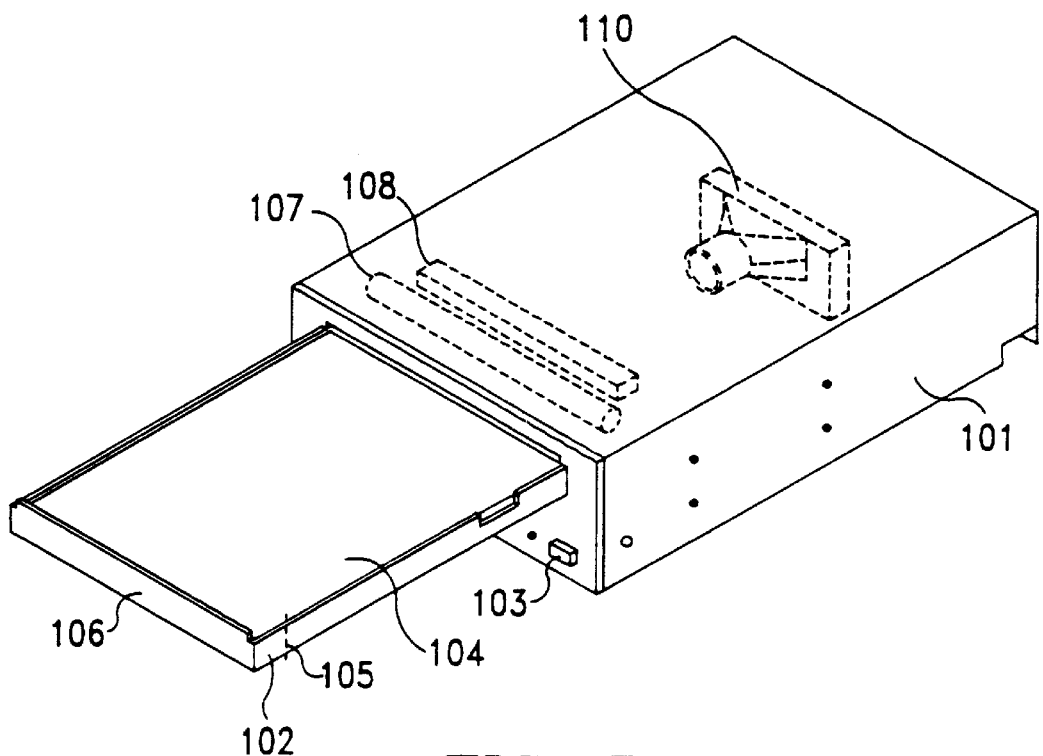
FIG. 1B describes a perspective view when the tray gets outside the housing device of the scanner.
Figure 1C:
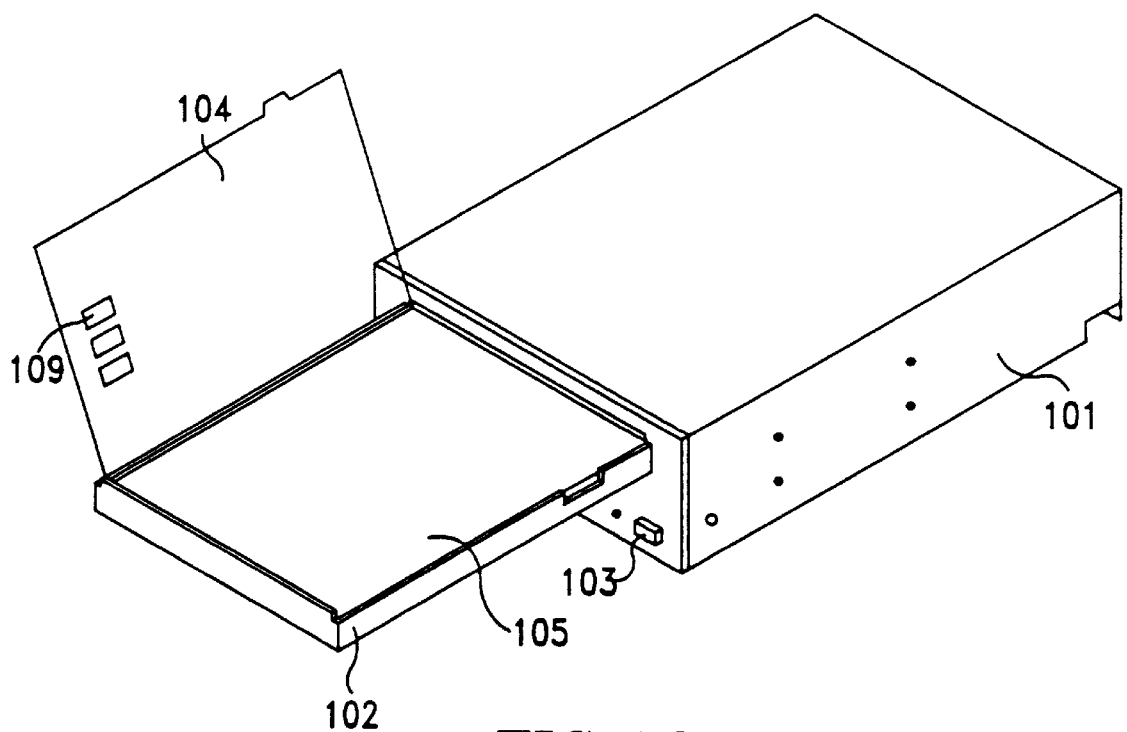
FIG. 1C is the perspective view when the tray gets outside the housing device of the scanner, wherein the tray cover is open.

FIG. 1A represents the perspective view of the scanned document auto-detecting apparatus. FIG 1B illustrates the perspective view of the scanned document auto-detecting apparatus when the tray 102 gets outside the housing device 101 of the scanner, and FIG. 1C further describes the situation of opening the tray cover 104. When the scanning procedure starts, the position of the specific pattern 109 will be first scanned to decide whether the scanned document is put on the transparent flat-top 105. Image information of the scanned document is then generated by applying an image scanning device that comprises a light source 107, a mirror 108, a lens, and a CCD (Charge-Coupled Device 110).

It is obvious that the scanned document must be an opaque document, and being placed close to the front side 106 of the housing device 101 to blocked the specific pattern 109 in scanning. In other words, when the specific pattern 109 is not covered by the scanned document, the analysis information from scanning results will indicate the specifications of the specific pattern 109. Please note that the image information of the scanned document is not scanned while the tray 102 just gets in the housing device 101, and it is necessary to confirm the scanned document has been pressed completely by the cover 104. In addition, the operations of getting the tray out and in the housing device are under controlled by software or by the button 103.

Although the imaging sensor in the embodiment is based on a well-known CCD (Charge Coupled Device) structure, other image sensor such as CIS (Contact Image Sensor) can be applied to replace the CCD imaging structure. Devices used in a common scanner also can be applied in the embodiment, such as applying a cassette in stead of the tray, applying lamps as light source in the scanner, and applying rollers, a rack, or gear sets to feed the scanned document. The position of the specific pattern 109 can be modified in accordance with applications.

Figure 2:
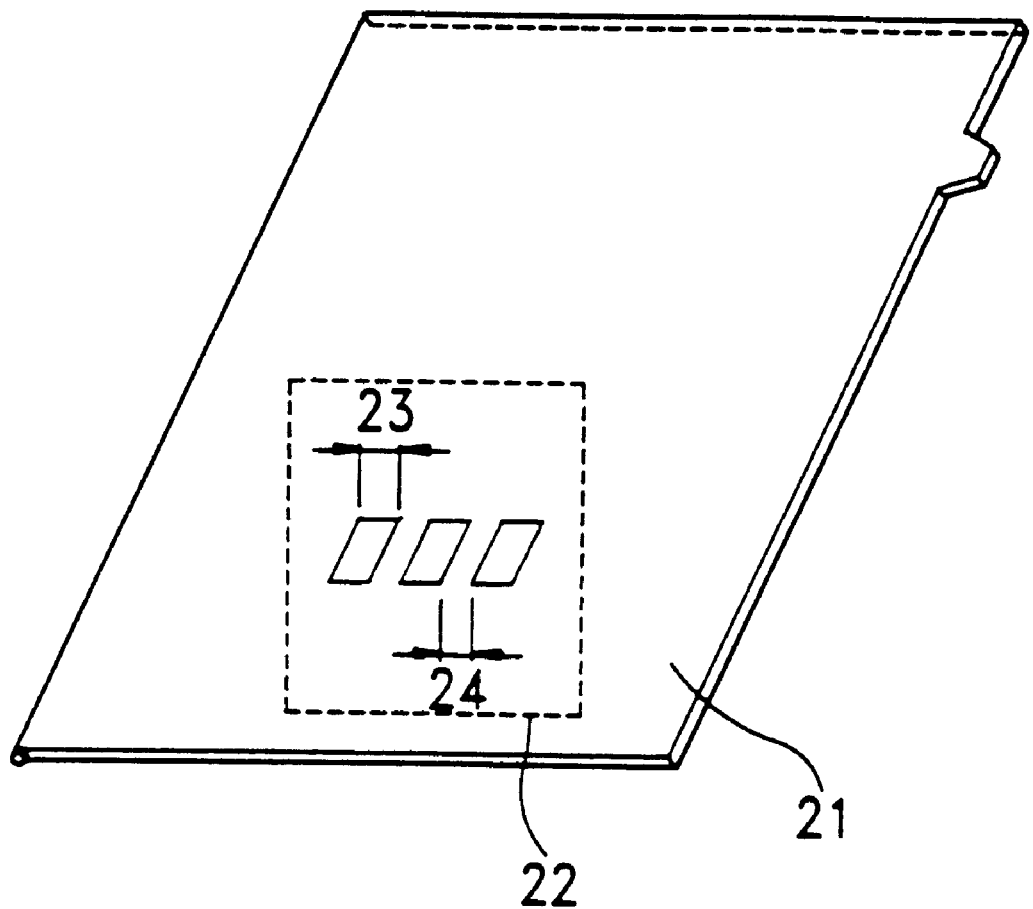
FIG. 2 illustrates the specific pattern the scanned document auto-detecting apparatus according to the invention.

FIG. 2 illustrates the specific pattern 22 of the embodiment, which is allocated on inner side of the tray cover 21. The specific pattern 22 includes three stripes 23 with equal size. The stripes are all white and the inner side of the tray cover is black. The length of each the stripe is 3.8 mm (millimeter), and the interval 24 between any two stripes is 1.9 mm. Some scan lines are obtained from the positions of the specific pattern, and the average widths of the white stripe and the intervals are then computed. A quotient derived by using the stripe average width to divide the average of the stripe interval can be computed for deciding whether the specific pattern is scanned.

Please note that the color, width, and quantities of the stripes can be modified according to applications. Any color distinguished with the color of the inner tray cover 21 can be applied as the color of the stripes 23. The only constraint to the stripe width is that the stripe width must be equal as the stripe average width being meaningful. Similarly, each the interval width must be equal based on the same reason. The stripe quantities can be modified as applications, which will not be constrained to three stripes as the embodiment.

Figure 3:
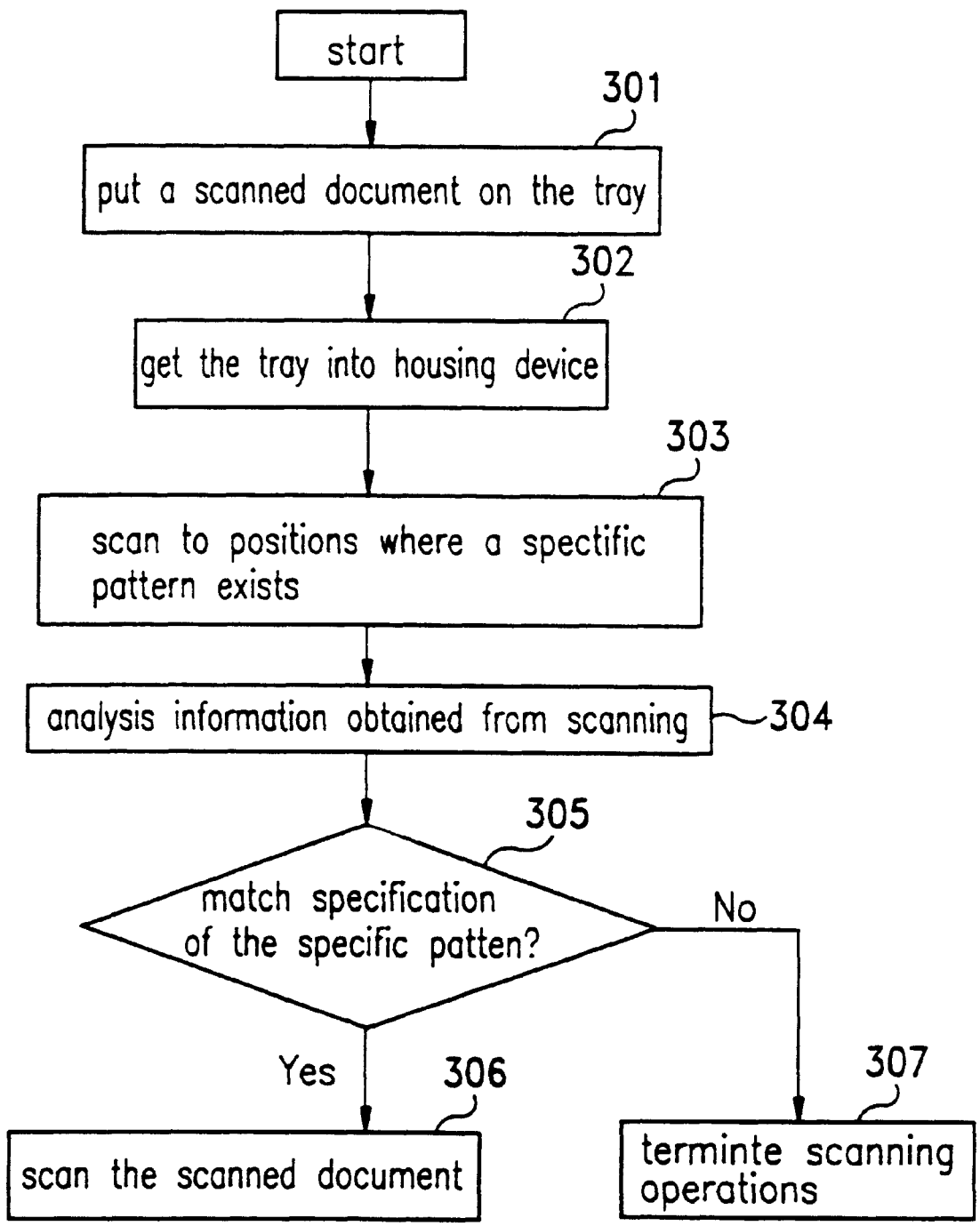
FIG. 3 is a flow chart for describing the scanning operations of the scanned document auto-detecting apparatus.

FIG. 3 illustrates the scanning operations of the embodiment. The first step is to get the tray 102 out the housing device 101 and put the scanned document into the tray 102 (step 301). The tray 102 then gets in the housing device 101 for scanning after the tray cover being closed (step 302). Scanning lines from where the specific pattern 22 allocated are obtained (step 303). An analysis procedure is then applied for analyzing the information of the scan lines (step 304) as to decide whether the specific pattern 22 is scanned (step 305). If the analysis result implies that the specific pattern 22 has been scanned, the scanning procedure will be terminated (step 307). Otherwise, the scanned document has been put inside the tray 102, and thus continues the sequence scanning procedure (step 306).

Figure 4:
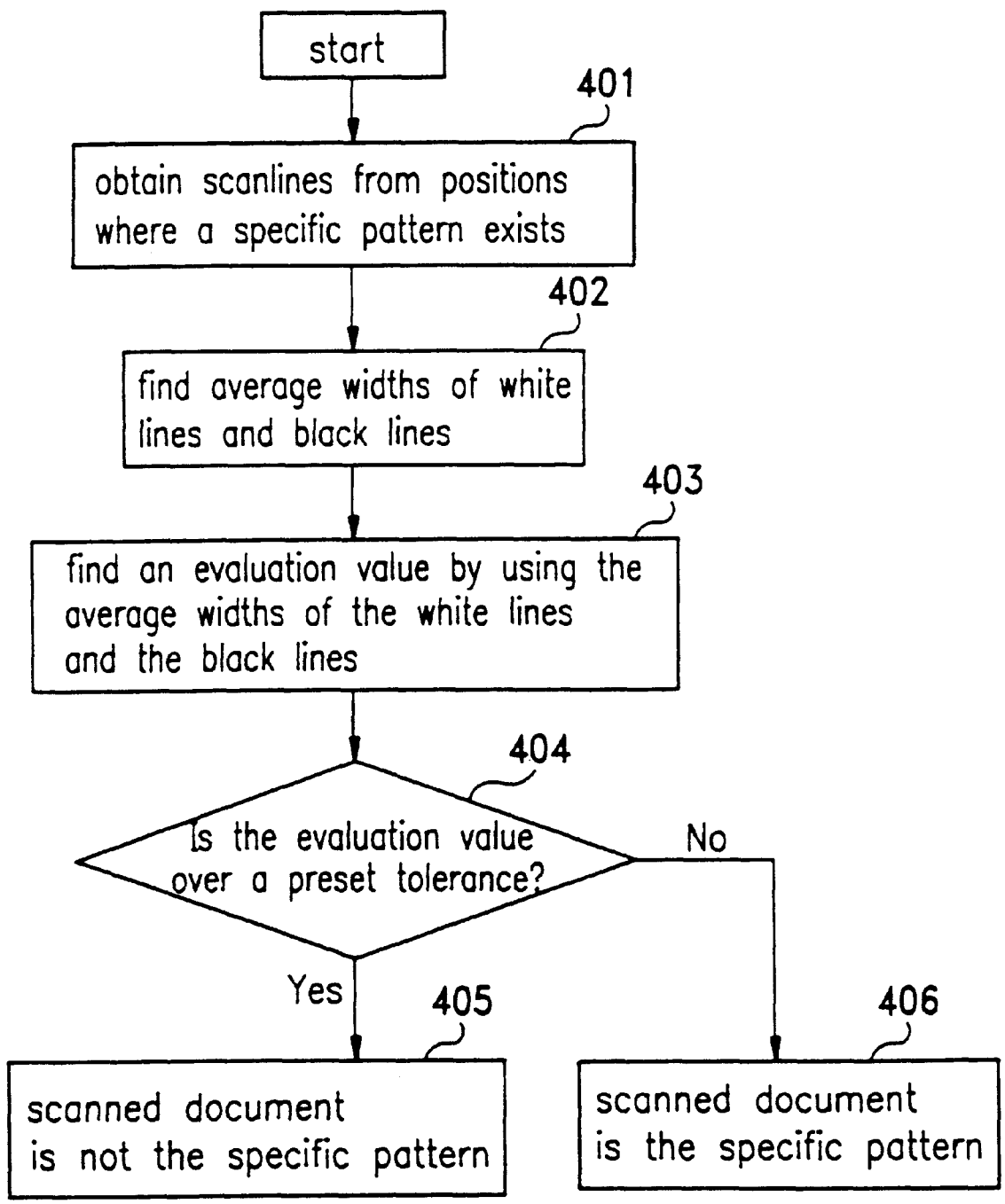
FIG. 4 represents a flow chart for describing the operations of deciding the presence of the scanned document.

The operations of deciding the presence of the scanned document are described in the FIG. 4. When the scan lines have been obtained (step 401), the stripe average width and the average width of the stripe interval are then computed from the scan lines (step 402). An evaluation is derived from the stripe average width and the interval average width (step 403), and then a decision is performed for confirming whether the evaluation is higher than a preset tolerance (step 404). If the evaluation is lower than the preset tolerance, it implies that the specification of the specific pattern is achieved, which also implies that the specific pattern is scanned (step 406). Otherwise, it indicates that the scanned document has been put inside the tray when the evaluation is higher than the preset tolerance (step 405).

The specific pattern 22 includes three white stripes with equal width in the embodiment, and each the scan line obtained in the step 401 will include three white lines and with two black lines as spaces. The three white lines will be theoretically equal to each other because the widths of the three white stripes are equal. Similarly, the widths of these two black lines are equal theoretically. The average width of the three white lines and the average width of the two black lines is computed, and according to the following definition to find the evaluation:

$$\left| \frac{W_{white}}{W_{black}} - n \right| \leq \delta \qquad \text{(equation 1)}$$

The $W_{white}$ represents the average width of the white lines (i.e., the average width of the white stripes), and $W_{black}$ represents the average width of the black lines (i.e., the average width of the intervals). The $\delta$ is a tolerance, and the n is a theoretical ratio, which represents the ratio of the $W_{white}$ to the $W_{black}$. In the embodiment, the $W_{white}$ is 3.8 mm (millimeter) and the $W_{black}$ is 1.9 mm. The theoretical ratio n is thus equal to 2.0 (3.8/1.9=2/0). The tolerance $\delta$ is 0.3 in the embodiment, but it can be modified according to applications.

In addition, the way of deciding whether the specific pattern is detected, is based on the total quantities of the scanned lines that matches the (equation 1). For example, the specific pattern is scanned when there are 5 scanned lines follow the (equation 1) in total 10 scanned lines. Furthermore, this decision rule is also varied according to applications.

Figure 5:
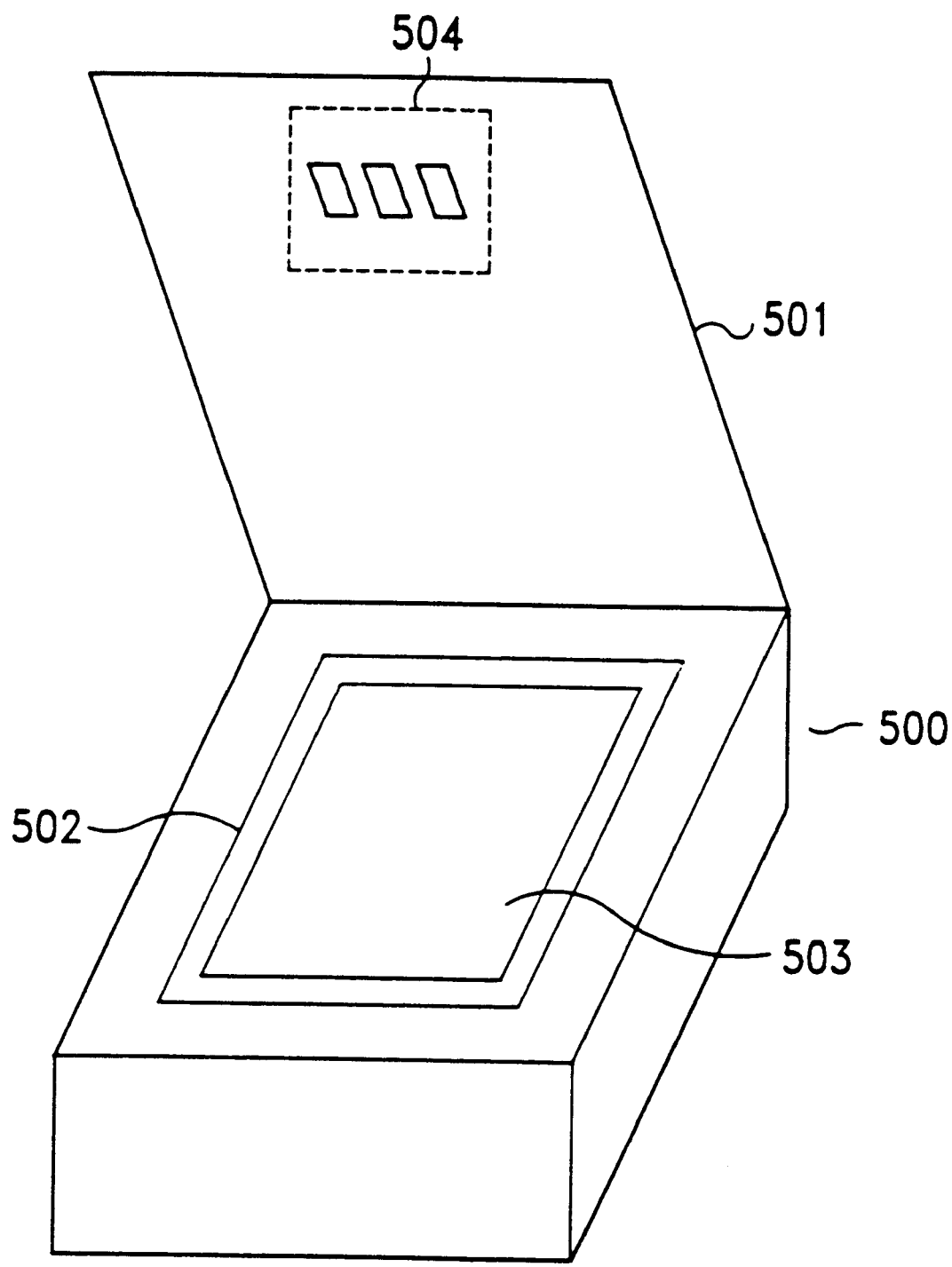
FIG. 5 illustrates the position of the specific pattern while applied in a flat-bed scanner.

FIG. 5 represents the perspective view when a scanned document is detected in flat-bed scanner. The cover 501 of the flat-bed scanner 500 is used to press the scanned document 503, and the transparent flat-top 502 is where the scanned document 503 is put. The flat-bed scanner 500 will scan the position of the specific pattern 504 for checking the presence of a scanned document 503 before scanning, and the specifications of the specific pattern 504 such as stripe color, stripe quantities, and stripe intervals are also varied according to applications.

In conclusion, the present invention discloses an auto-detecting apparatus for detecting the presence of the scanned document without additional control circuit. Based on the decision result, a scanning procedure starts to degrade cost by removing the additional control circuit. The scanned document auto-detecting apparatus prevents users' time being wasted from running the scanning procedure when there is no scanned document.

As is understood by a person skilled in the art, the foregoing preferred embodiments of the present invention are illustrated of the present invention rather than limiting of the present invention. It is intended to cover various modifications and similar arrangements included within the spirit and scope of the appended claims, the scope of which should be accorded the broadest interpretation so as to encompass all such modifications and similar structure.

What is claimed is:

1. A reflective scanning apparatus comprising:
an inputting means for feeding a scanned object into said reflective scanning apparatus, wherein said inputting means comprises a pattern formed thereon for detecting the presence of said scanned documents, wherein said pattern comprises a plurality of stripes with equal size, and a plurality of stripe intervals being formed between thereof, said plurality of stripes having a first color that is distinguishable from a second color of said plurality of stripe intervals, wherein a first average width of said plurality of stripes and a second average width of said plurality of stripe intervals are used to determine whether a ratio between thereof is within a defined tolerance or not, thereby determining whether said scanned documents are present in said inputting means;
a light source in said reflective scanning apparatus for illuminating light to said scanned documents; and
image pick-up means responsive to said light reflected from said scanned documents for picking up said image information of said scanned document.

2. The reflective scanning apparatus according to claim 1, wherein said inputting means comprises a cover for pressing said scanned documents.

3. The reflective scanning apparatus according to claim 2, wherein said pattern is located on one side of said cover.

4. The reflective scanning apparatus according to claim 1, wherein said image pick-up means comprises a charge-coupled device.

5. The reflective scanning apparatus according to claim 1, wherein said image pick-up means comprises a contact image sensor.

6. The reflective scanning apparatus according to claim 1, said scanning apparatus further comprising a housing device for mounting said scanning apparatus inside a computer case.

7. A method for detecting a presence of a scanned document before scanning image information of said scanned document in a reflective scanning apparatus, said detecting method comprising the steps of:

scanning a plurality of scan lines where at a specific pattern is allocated, wherein said specific pattern comprises a plurality of stripes and a plurality of stripe intervals formed between thereof, said plurality of stripes having a first color that is distinguishable from a second color of said plurality of stripe interval space;

obtaining a first average width of said plurality of stripes in each said scan line and obtaining a second average width of said plurality of stripe intervals in each said scan line;

obtaining a quotient as a detection information by using said first average width and said second average width, wherein said quotient is defined as $|W_1/W_2 - n| < \delta$, wherein said $W_1$ represents said first average width of said plurality of stripes, and said $W_2$ representing said second average width of said plurality of stripe intervals, wherein said $\delta$ is defined as a tolerance, and wherein said n is a theoretical ratio of said $W_1$ to said $W_2$;

checking said presence of said scanned document by determining whether said detection information meets the requirement of said quotient; and scanning said image information of said scanned document when said scanned document exists.

8. A method for detecting a presence of a scanned document before scanning image information of said scanned document, said detecting method comprising the steps of:

scanning a plurality of scan lines where at a specific pattern is allocated, wherein said specific pattern comprises a plurality of stripes and a plurality of stripe intervals formed between thereof, said plurality of stripes having a first color that is distinguishable from a second color of said plurality of stripe interval space;

checking said presence of said scanned document by determining a detection information of said specific pattern meets the requirement of a formula or not, wherein said determining said detection information includes (1) obtaining a first average width of said plurality of stripes in each said scan line (2) obtaining a second average width of said plurality of stripe intervals in each said scan line, and (3) obtaining a quotient as said formula by using said first average width and said second average width; and scanning said image information of said scanned document when said scanned document exists.

9. The method of claim 8, wherein said quotient is defined as $|W_1/W_2 - n| \leq \delta$, wherein $W_1$ represents said first average width of said plurality of stripes, and said $W_2$ representing said second average width of said plurality of stripe intervals, wherein said $\delta$ is defined as a tolerance, and wherein said n is a theoretical ratio of said $W_1$ to said $W_2$.

* * * * *